Nov. 7, 1961     E. W. ERIKSON     3,007,448
HYDRAULIC CONTROL SYSTEM
Filed Aug. 28, 1959
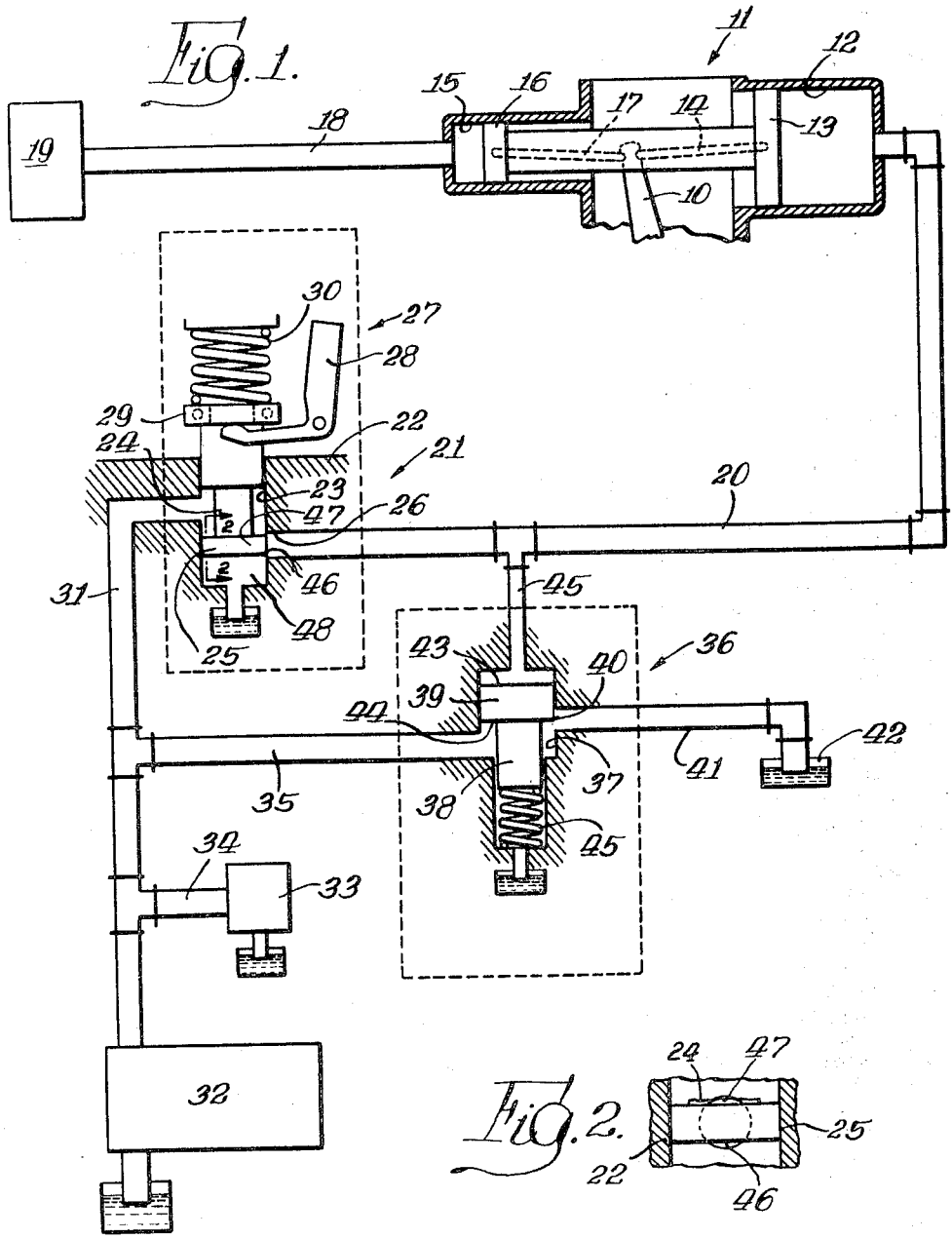
INVENTOR.
Evans W. Erikson,
BY Hofgren, Brady,
Wegner, Allen & Stellman Atty's.

United States Patent Office 3,007,448
Patented Nov. 7, 1961

3,007,448
HYDRAULIC CONTROL SYSTEM
Evans W. Erikson, Rockford, Ill., assignor to Sundstrand Corporation, a corporation of Illinois
Filed Aug. 28, 1959, Ser. No. 836,713
7 Claims. (Cl. 121—43)

This invention relates to a hydraulic circuit and more particularly to a hydraulic circuit for controlling the pressure delivered to a control device to be operated thereby.

It is the general object of the present invention to produce a new and improved hydraulic circuit of the character described.

It is a more particular object of the invention to produce a hydraulic circuit particularly adaptable for use in connection with a governor operated valve which will provide for improved operation of the circuit with varying load and with changes in viscosity of the control fluid.

A further object of the present invention is to produce a hydraulic control circuit wherein the fluid pressure to a device to be controlled is regulated by a governor operated valve and in which the position of the valve may be maintained at a predetermined point regardless of changes in the pressure required to maintain the device in a predetermined position.

Hydraulic circuits employing fly-ball operated, spring opposed, governor operated valves for varying the fluid pressure applied to a control device have been used in many systems. One such system is shown in the Sadler et al. Patent No. 2,803,112, wherein a hydraulic piston and cylinder device is utilized to control the position of a pump and thus control the output of the pump. In such an apparatus the pressure of the pump pistons against the wobbler tends to move the same toward neutral position and this movement of the wobbler is opposed by a hydraulic piston and cylinder control device, in turn operated by fluid pressure controlled by a governor. In such an installation, should the load on the pump increase, the force tending to move the wobbler toward neutral position similarly increases and additional control fluid pressure must be applied against the control device in order to maintain the wobbler in the desired predetermined position. Such increased control pressure is, of course, supplied to the device by movement of the governor operated valve but a speed droop must necessarily occur under such circumstances, inasmuch as the governor valve is moved to a new position and hence the spring force opposing the bias of the flyweights has been changed.

According to the present invention, however, droop due to the application of a load is eliminated by virtue of the fact that the governor valve need not be maintained in a different position to maintain a constant pump output with changes in the load applied. Furthermore, the valve position and pressure relationships do not change with changes in viscosity of the control fluid, a change which occurs with changes in temperature.

Other and further objects and advantages of the present invention will be readily apparent from the following description and drawings, in which:

FIGURE 1 is a schematic diagram of a control circuit embodying the present invention; and FIGURE 2 is a fragmentary illustration of a portion thereof.

While this invention is susceptible of embodiment in many different forms, there is shown in the drawing and will herein be described in detail one specific embodiment, with the understanding that the present disclosure is to be considered as an exemplification of the principles of the invention and is not intended to limit the invention to the embodiment illustrated. The scope of the invention will be pointed out in the appended claims.

Referring now to the drawing, there is shown an embodiment of the hydraulic control system especially applicable to the apparatus shown in the aforementioned Sadler et al. Patent 2,803,112. The apparatus shown in the Sadler et al. patent and to which the present invention is particularly applicable, includes a wobbler type pump supplying fluid under pressure to a hydraulic motor to rotate the same. The position of the wobbler is adjusted to maintain a constant output speed of the shaft driven by the motor and a governor is driven by the output shaft to sense such speed. The governor controls a valve delivering hydraulic fluid to a fluid pressure operated device to shift the position of the wobbler, thereby increasing or decreasing pump output to maintain the speed of the output shaft at a constant rate.

Thus, there is utilized a lever 10 connected to the wobbler of the pump hereinbefore mentioned for moving the same together with a hydraulic control device 11 operable to move the lever. The control device includes a first cylinder 12 in which a first piston 13 is reciprocable with the piston being attached to a connecting rod 14, in turn connected to the lever 10. The control device 11 includes a second cylinder 15 having a piston 16 reciprocable therein with the piston being attached to a connecting rod 17 connected to the opposite side of the lever 10 from the rod 14. The pistons 16 and 13 move together as a unit in response to varying fluid pressures applied to their faces. Conduit 18 connects the cylinder 15 with a constant source of fluid pressure, such as the pump indicated at 19, and thus the piston 16 is constantly urged to the right, a direction tending to move the lever 10 and the wobbler connected thereto toward neutral position.

The cylinder 12 is connected by means of a passage 20 to a governor valve 21. The governor valve is provided with a casing 22 having a bore 23 therein and a valve stem 24 is slidable in the bore and carries at one end a land 25 controlling a port 26 in the bore which connects with the passage 20. The governor device 27 includes a flyweight 28 operable against a collar 29 secured to the valve stem 24 and tends to lift the same with increased rotation of the stem against the opposition of a speeder spring 30. The valve stem 24 and hence the flyweight 28 are connected to the output shaft driven by the hydraulic motor previously mentioned.

A passageway 31 opens at one end to the interior of the bore 23 and is connected at the other end to a positive displacement pump 32 which is capable of supplying fluid pressure to the passage 31 in excess of that required to overcome the bias of the piston 16 and pump 19 previously described. An over-pressure relief valve 33 is connected to the passageway 31 by means of conduit 34 and a second conduit 35 connects the passageway 31 to a control valve generally indicated at 36.

The control valve 36 is provided with a bore 37 having a valve stem 38 slidable therein, which stem carries a land 39 controlling a port 40 opening into a conduit 41 and drain 42. The top surface 43 of the land 39 is exposed to the fluid pressure in passage 20 through passage 45, while the bottom surface 44 is exposed to the fluid pressure in supply passage 31. Spring 45 physically stabilizes valve stem 38 and prevents it from remaining in the extreme lower end of its stroke.

Pump 32 is a constant displacement device and if none of the hydraulic fluid were drained from the system, the pressure would be limited only by pump leakage and would be extremely high. Control valve 36 provides a variable drain which establishes the pressure in supply passageway 31 at a predetermined ratio (equal to the ratio of the area of land surface 43 to the area of land surface 44) with respect to the pressure in passageway 20, by controlling the opening size of port 40 through which a portion of the hydraulic fluid is drained from the system.

Assuming that the showing in the drawing illustrates a condition of steady state operation of the wobbler pump, the pressure in the passage 20 has a predetermined ratio to the pressure in the passageway 31 and land 25 of governor valve 21 establishes a certain related ratio between the pressure drops across orifices 46 and 47. Should a load now be applied to the pump which tends to move the lever 10 to the right, such tendency is overcome only by increasing the pressure in the passage 20. This is normally done by virtue of the fact that the governor 27 senses the reduced speed in the output of the device whereupon the spring 30 moves the land 25 downwardly increasing orifice 47 and decreasing orifice 46, thereby increasing the pressure in the passage 20. While such increase in pressure will be sufficient to overcome the increased tendency of the lever 10 to move rightward, the fact remains that the valve stem 24 has assumed a new position and the spring pressure operated in the new position is thereby different. Speed droop results.

With the hydraulic system shown in the drawing, however, a speed droop will not result inasmuch as the increased pressure in the passage 20 caused by such movement of the land 25 is transmitted to the surface 43 moving the land 39 downwardly against the opposition of the spring 44, thereby throttling the port 40 and thus increasing the pressure in the passageway 31 to a point where the land 25 resumes the position shown and where again the pressures in the passageway 31 and passage 20 differ at the predetermined ratio.

Preferably the area of land surface 43 is two times the area of land surface 44 establishing the pressure in supply passageway at two times the pressure in passage 20. With this relationship, the pressure drops across orifices 46 and 47 are equal. These orifices are identical in geometry, as seen in FIGURE 2, and the change in leakage flow rate with change of the viscosity of the fluid does not require a change of position of land 25 to maintain the 2 to 1 pressure ratio in passageways 31 and 20.

I claim:

1. A hydraulic control circuit for supplying fluid pressure to a device to be controlled thereby comprising a source of control fluid under pressure, means connecting the source to said device including a valve movable to control the pressure of fluid downstream of the valve and delivered to said device, and means connected with said connecting means downstream of said valve and responsive to the controlled downstream pressure for varying the pressure of fluid upstream of the valve in response to changes in said downstream pressure to maintain a predetermined ratio of the pressures.

2. A hydraulic control circuit for supplying fluid pressure to a device to be controlled thereby comprising a source of control fluid under pressure, means connecting the source to said device including a valve movable to control the pressure of fluid downstream of the valve and delivered to said device, and connected with said connecting means downstream of said valve and responsive to the controlled downstream pressure means for maintaining the pressure upstream of the valve at double said downstream pressure.

3. A hydraulic control circuit for supplying fluid pressure to a device to be controlled thereby comprising a source of control fluid under pressure, said source producing an excess of fluid pressure, means connecting said source to said device including a valve movable to control the pressure of fluid downstream of the valve and delivered to said device, means connected between the source and said valve for bleeding off a portion of the pressure from the source upstream of the valve, and means connected with said connecting means between said valve and said device and connected with said bleeding means for operating said bleeding means in accordance with changes of said downstream pressure to maintain a predetermined ratio of the upstream and downstream pressures.

4. A hydraulic control circuit for supplying fluid pressure to a device to be controlled thereby comprising a source of control fluid under pressure, a valve having a bore therein and a port in the bore, a passage connecting the port to the device, a passageway connecting the source to the bore, a valve slidable in the bore and having a land controlling the port, said land when centered in relation to the port producing a pressure in the passage equal to half the pressure in the passageway, and means operable in response to changes of pressure in said passage to maintain the pressure in said passageway at double the passage pressure.

5. A hydraulic control circuit for supplying fluid pressure to a device to be controlled thereby comprising a source of control fluid under pressure, a valve having a bore therein and a port in the bore, a passage connecting the port to the device, a passageway connecting the source to the bore, a valve slidable in the bore and having a land controlling the port, said land when centered in relation to the port producing a pressure in the passage equal to half the pressure in the passageway, a flyball governor connected to the valve to move the same, a second valve movable to control the pressure in said passageway, fluid pressure operated means for moving said second valve, and means connecting the fluid pressure operated means to said passage to move the second valve in response to changes in pressure in said passage.

6. The hydraulic circuit of claim 5 in which said fluid pressure operated means moves the second valve to maintain the pressure in the passageway at double the pressure in said passage.

7. A hydraulic control circuit for operating a piston and cylinder control device comprising a first source of constant fluid pressure connected to operate against one side of said device, means for applying a variable pressure against the other side of said device including a second source of control fluid under pressure, said second source producing a pressure capable of moving said device against the force applied by the first source, a valve having a bore therein and a port in the bore, a passage connecting the port to the other side of the device, a passageway connecting the second source to the bore, a valve slidable in the bore and having a land controlling the port, said land when centered in relation to the port producing a pressure in the passage equal to half the pressure in the passageway, and means operable in response to changes of pressure in said passage to maintain the pressure in said passageway at double the passage pressure.

References Cited in the file of this patent

UNITED STATES PATENTS

| 1,816,829 | De Leeuw | Aug. 4, 1931 |
| 2,770,222 | Anderson | Nov. 13, 1956 |

FOREIGN PATENTS

| 7,553 | Australia | May 10, 1928 |